June 2, 1959  H. E. SHEFFER ET AL  2,889,304
POLYESTER RESIN, METHOD OF PREPARING SAME AND ELECTRICAL
CONDUCTOR COATED THEREWITH
Filed March 7, 1957
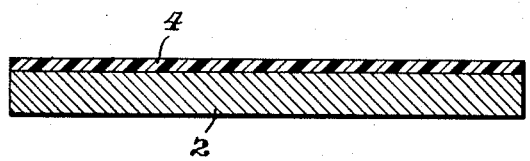
INVENTORS
Howard E. Sheffer
John F. Meyer
BY Cushman, Darby & Cushman
ATTORNEYS

2,889,304

POLYESTER RESIN, METHOD OF PREPARING SAME AND ELECTRICAL CONDUCTOR COATED THEREWITH

Howard E. Sheffer, Burnt Hills, and John F. Meyer, Schenectady, N.Y., assignors to Schenectady Varnish Company, Inc., Schenectady, N.Y., a corporation of New York Application March 7, 1957, Serial No. 644,499

27 Claims. (Cl. 260—33.4)

The present invention relates to the preparation of polymeric polyhydric alcohol esters of terephthalic acid suitable for use as wire enamels and to electrical conductors coated with such esters.

Polymeric ethylene terephthalate has been proposed as an insulant for electrical conductors. However, it is difficult to dissolve polymeric ethylene terephthalate of sufficiently high molecular weight for use as an insulant in solvents. This, necessarily, renders more difficult the problem of coating of the conductor.

It has also been proposed to coat electrical conductors with a solution of a polymeric ester of glycerine or pentaerythritol with terephthalic acid which has been prepared in the presence of a water immiscible solvent taken from the group consisting of tertiary amines, dialkyl amides, ketones and esters of fatty acids and certain esters and ethers of ethylene glycol and polyethylene glycol. However, the solvents employed are relatively expensive. Moreover, completely satisfactory wire enamels have not been obtained by such a process. If the polyester is modified by a silicone, there is improved adhesion and flexibility, but, again, the final product leaves something to be desired.

A further suggestion has been made to replace part of the terephthalic acid by certain aliphatic dicarboxylic acids, but this method also is not a complete solution to the problem.

It has also been proposed in Belgian Patent 543,486 to coat electrical conductors with a solution of a polymeric ester of either terephthalic acid or isophthalic acid with a mixture of alcohols, ethylene glycol and a polyhydric alcohol, such as glycerine or pentaerythritol. The polymeric ester is made by utilizing certain critical equivalent ratios of dimethyl terephthalate, for example, ethylene glycol and the polyhydric alcohol, e.g., glycerine.

This Belgian patent states that the only satisfactory glycol is ethylene glycol and does not disclose any other glycols can be used. In each of the examples of this Belgian patent only ethylene glycol is used.

It is an object of the present invention to provide a superior wire enamel composition including a polymeric ester of terephthalic acid or isophthalic acid with a glycol and a polyhydric alcohol having at least three hydroxyl groups.

An additional object is to prepare such compositions from glycols other than ethylene glycol.

A further object is to prepare such compositions having greater heat shock resistance than is possible when ethylene glycol is employed.

Yet another object is to prepare such compositions wherein a portion of the ethylene glycol is replaced by a different glycol.

A still further object is to provide a wire having a coating of a polymer of an ester of terephthalic or isophthalic acid with a glycol as hereinafter defined and a polyhydric alcohol having at least three carbon atoms which is substantially free of other polymers, but still exhibits good flexibility and adherence to the wire.

A further object is to improve the abrasion-resistance of wire enamels containing a polymeric ester of terephthalic acid with a polyhydric alcohol.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the foregoing objects can be attained by reacting a polyhydric alcohol having at least three hydroxyl groups, such as glycerine, pentaerythritol, 1,1,1-trimethylolethane, 1,1,1-trimethylolpropane, sorbitol, mannitol, dipentaerythritol, diglycerol, etc., or mixtures of these alcohols together with an $\alpha,\omega$ aliphatic hydrocarbon diol having 4 to 5 carbon atoms, e.g., butanediol 1,4; pentanediol 1,5; butene-2-diol 1,4 and butyne-2-diol 1,4 with terephthalic acid or isophthalic acid or acyl halides thereof, e.g., terephthalic acid dichloride, or a lower dialkyl ester thereof, e.g., methyl, ethyl, propyl, butyl, amyl, hexyl and octyl terephthalates and the corresponding isophthalates as well as the half esters, e.g., monomethyl terephthalates, as well as mixtures of such esters and acids or acid halides. A portion of the 4 to 5 carbon atom aliphatic hydrocarbon diol can be replaced by ethylene glycol so that the total alkanediol present 20 to 100 weight percent of the glycol is the 4 to 5 carbon atom aliphatic hydrocarbon diol and the balance is ethylene glycol; when using a mixture of alkanediols usually 10 to 80% is ethylene glycol.

Among the preferred compositions are those containing no ethylene glycol, i.e., all of the dihydric alcohol is an $\alpha,\omega$ aliphatic hydrocarbon diol having 4 to 5 carbon atoms.

Another preferred group of compositions are those wherein on a mol basis about 35% of the dihydric alcohol is an $\alpha,\omega$ aliphatic hydrocarbon diol having 4 to 5 carbon atoms and about 65% of the dihydric alcohol is ethylene glycol. Any substantial variation above or below this ratio of 4 to 5 carbon atom diol to ethylene glycol results in a marked reduction in temperature in the cut-through temperature test for example, in products which are relatively low in glycerine (except for those products wherein substantially 100% of the dihydric alcohol is the 4 to 5 carbon atom aliphatic diol).

It has also been found that at the lower end of the range for the glycerine component that there is a significant increase in the stability of compositions employing a mixture of the 4 to 5 carbon atom aliphatic diol and ethylene glycol in contrast to ethylene glycol alone. Thus, a polyester composition made from 776 parts of dimethyl terephthalate, 175 parts of ethylene glycol and 120 parts of glycerine began to precipitate from cresylic acid solution after 3 months' storage whereas identical compositions wherein either 20 or 40 mol percent of the ethylene glycol was replaced by 1,4-butanediol were stable for over 6 months without precipitation.

The preferred polyhydric alcohols having at least three carbon atoms are glycerine and pentaerythritol and the preferred phthalic compound is dimethyl terephthalate.

The preferred alkanediol is 1,4-butanediol.

The transesterification reaction and polymer formation between the dialkyl terephthalate, polyhydric alcohol having at least three hydroxyl groups and aliphatic hydrocarbon diol can be carried out in the absence of a solvent, but preferably cresol or cresylic acid is present as a solvent. While it is not essential to use an esterification catalyst, it is frequently desirable to do so. Conventional catalysts such as hydrochloric acid, toluene sulfonic acid, litharge lead acetate, zinc oxide, ferric acetate, etc. can be used. The preferred catalyst is litharge.

For each 776 parts (4 mols) of dimethyl terephthalate there are employed sufficient alcohol, i.e., aliphatic hydrocarbon diol and polyhydric alcohol having at least three hydroxyl groups, to provide at least about one hydroxyl group for each carboxyl (COO) group. Preferably, there are present a total of 1.0 to 1.6 hydroxyl groups on the alcohols for each carboxyl group on the terephthalic acid or derivative thereof.

Generally, from 30 to 70% of the total alcohol by weight has at least three hydroxyl groups and the balance 70 to 30% by weight is aliphatic hydrocarbon diol. As previously mentioned, 20 to 100% of the diol by weight is butanediol 1,4; pentanediol 1,5; butene-2-diol 1,4 or butyne-2-diol 1,4 (or a mixture of these materials) and the balance is ethylene glycol.

Another way of expressing the percentages of the various materials used as reactants is in equivalent percent. Generally, there is 25 to 56 equivalent percent of the terephthalic acid derivatvie, e.g., dimethyl terephthalate; 15 to 46 equivalent percent of the aliphatic hydrocarbon diol, e.g., butanediol 1,4, and 13 to 44 equivalent percent of the aliphatic polyhydric alcohol having at least three hydroxyl groups, e.g., glycerine; of the aliphatic hydrocarbon diol 20 to 100% by weight is $\alpha,\omega$ aliphatic hydrocarbon diol having 4 to 5 carbon atoms and the balance, i.e., 80 to 0% by weight is ethylene glycol. The equivalent percent has been defined in the literature as the number of equivalents of a particular reactant divided by the total number of equivalents of all reactants times 100.

Pentaerythritol can be used in pure form or as a commercial mixture such as a mixture of 90% pentaerythritol and 10% dipentaerythritol, commercially available as Pentek. The pentaerythritol can be used to replace the glycerine in whole or in part. Account should be taken in such replacement of the additional hydroxyl group available on pentaerythritol.

The single figure of the drawing is a section of an electrical conductor coated with the novel composition of the present invention.

Referring specifically to drawing, a copper wire 2 is coated with a resin composition 4, such as the resin composition of Example 1.

As previously stated, the solvent employed is cresylic acid. Generally, the cresylic acid has a boiling range of 200° to 220° C., e.g., about 205° C. Cresylic acid is defined in Bennett's Concise Chemical and Technical Dictionary (1947), as a mixture of o-, m-, and p-cresols having a boiling range of 185° to 230° C.

In place of cresylic acid, the individual cresols, e.g., para cresol, can be employed, but it is preferred to use the commercial cresylic acid mixture.

It is frequently desirable to dilute the cresylic acid with a heavy coal tar or petroleum naphtha or with xylene, etc. The naphtha can be employed in an amount of from 0 to 60%, e.g., 5 to 60%, based on the total weight of the solvent mixture. Cresylic acid is the better solvent insofar as solvent power is concerned, but the naphtha improves the smoothness of the coated wire. Preferably, the naphtha is added after the polyester has reached the desired stage of reaction, as indicated by viscosity determinations. However, the naphtha can be added earlier if desired. Various conventional naphthas, especially high boiling naphthas, can be employed, such as EW naphtha (an enamel wire heavy coal tar naphtha sold by the Barrett Division of Allied Chemical and Dye Corporation) and Solvesso No. 100, an aromatic naphtha derived from petroleum.

The temperature of reaction is not especially critical and temperatures conventionally employed in preparing known glycerine or ethylene glycol esters of terephthalic acid are used, e.g., 80° C. to reflux temperature for the solvent.

The reaction can be carried out either as a one-stage or as a multi-stage process. In a two-stage process the dimethyl terephthalate is reacted with the glycerine and alkanediol in cresylic acid until a predetermined intermediate viscosity is reached and then additional cresylic acid is added and the reaction continued until the final desired viscosity is attained. The proportions of cresylic acid to reactants are not especially critical, although significant amounts of cresylic acid, e.g., at least one part per ten parts of dimethyl terephthalate are usually employed in the first stage.

Usually, the reaction is continued until the product has a viscosity in cresylic acid of 4000 to 5000 centipoises, measured at 25° C. (room temperature) and at 35 to 45% solids concentration. Preferably, the reaction is carried out until the polyester has a Gardner-Holt viscosity of about $Z_3$ at 40% solids concentration in cresylic acid at room temperature.

The solution of the polymeric terephthalic acid ester in cresylic acid, with or without the naphtha, can be applied to wire, e.g., copper wire, by either of two methods conventionally employed in the wire enameling art. For example, it can be reduced in viscosity and solids content by using a mixture of crsylic acid and EW naphtha and run by the "free dip" method. In this method, the resin solution is thinned to a viscosity of about 50 to 100 centipoises, or less, at 25° C. and the copper wire run over a pair of half-submerged pulley wheels in a tank containing the thinned solution. Alternatively, the polyester can be used at a viscosity of 4000 to 5000 centipoises (25° C.) and used as a die application wire enamel. The resin solution also runs very well by the die application at 50 to 100 centipoises. The wire coated in either of these processes is then baked in a wire enameling oven at conventional temperatures above the boiling point of the solvent, e.g., 350° C. to 450° C., to complete the polymerization of the resin and to remove the solvent. Wire speeds of 18 to 40 feet/min. can be employed.

In the following examples and throughout this specification and claims, all parts are parts by weight, unless otherwise specified.

It has been further found that the addition of small amounts of zinc, lead, calcium or cadmium compounds materially improves the abrasion properties of the enamel. There can be used the usual zinc, lead, calcium or cadmium driers, such as the linoleates, octoates and resinates of each of these metals, e.g., zinc resinate, cadmium resinate, lead linoleate and calcium linoleate. However, it has been found preferable to employ the naphthenates, specifically zinc naphthenate, lead naphthenate, calcium naphthenate, and cadmium naphthenate.

Other metal driers, specifically polyvalent metal driers, such as manganese naphthenate and cobalt naphthenate, can also be employed, although the zinc, lead, calcium and cadmium naphthenates, as previously stated, are preferred.

The metal compound is preferably used in an amount between 0.2% and 1.0% metal based on the total solids of the enamel.

The enamels of the present invention, both with and without the addition of the metal drier, have outstanding resistance to high temperatures, thus enabling them to be used as Class B insulation.

In Examples 1–19 unless otherwise indicated, the polyester resin solution was applied to a #18 A.W.G. wire by the die application procedure using a wire speed of 25 feet/min. and thereafter passing the coated wire through a 12 foot oven at a temperature of 399° C. (750° F.). Six passes of the wire through the solution and oven were employed and the total build-up of resin enamel on the wire in each case was about 2.7 to 3.0 mil.

The wire enamel resins were applied from solution at from 25 to 50% solids concentration as shown in the examples.

It has been found desirable that the enamel coated wire pass certain tests in order to be suitable for use at 135° C. for an extended period of time. Thus, in the abrasion-resistance test the enameled wire should withstand 20 strokes and preferably 30 strokes. The enameled wire should also pass the 25% elongation plus 3X flexibility test. Likewise, it should pass the 50-50 solvent-resistance test and the dielectric strength test. In the elongation after heating agent test it should meet the conditions of 5X Mandrel after 100 hours at 185° C. It should pass the 5X Mandrel heat shock test. In the cut-through temperature test the minimum cut-through temperature is 160° C. and desirably should be above 175 and preferably even higher. In the high temperature dielectric strength test there should be less than 70% loss of dielectric strength in 25% relative humidity for 500 hours at 200° C. using 2000 volt test voltage. The enameled wires prepared from the compositions of Examples 1–19 were tested and passed all of these tests. The tests themselves are described in more detail in the aforementioned Belgian patent. In view of the use of aliphatic hydrocarbon diols having 4 to 5 carbon atoms, the high cut-through temperatures are especially surprising.

In Examples 1–19 the following procedure was used. The glycerine, dimethyl terephthalate, aliphatic hydrocarbon diol having 4 to 5 carbon atoms (and ethylene glycol, when employed), litharge catalyst and cresylic acid solvent were placed in a reactor fitted with an agitator, thermometer and a short air-cooled column connected to a distillation condenser.

The reactor was then heated to 177° C. and the agitator was started. The temperature was then gradually raised to a temperature between 232 and 243° C. over a period of 6 hours. The rate of temperature rise was maintained at about 11° C. per hour during this period. There was a steady distillation of methanol. The mixture in the reactor was then maintained at 232 to 243° C. until the Gardner-Holt viscosity was $Z_2$ measured at 40% solids in cresylic acid. Generally, it required 6 to 12 hours of cooking at 232 to 243° C. to reach this viscosity. When each batch reached a viscosity of $Z_2$ at 40% solids, it was then diluted with a thinner (cresylic acid or a mixture of cresylic acid and xylol) and a solution of 40 parts of 9% zinc octoate in E.W. naphtha added and the mixture applied to #18 A.W.G. wire by the die application procedure in the manner previously set forth.

Example 1

| | Parts |
|---|---|
| Dimethyl terephthalate | 776 |
| Ethylene glycol | 140 |
| Glycerine | 120 |
| Butanediol 1,4 | 51 |
| Cresylic acid | 200 |
| Litharge | 0.2 |

When a viscosity of $Z_2$ measured at 40% solids in cresylic acid was reached by the reaction procedure just set forth, the reaction mixture was diluted with cresylic acid to give a 39% solids content and a viscosity of $Z_1$ to $Z_2$. To the thus diluted mixture were added 40 parts of the 9% zinc octoate in E.W. naphtha and then the composition applied to #18 A.W.G. wire by the die application procedure using 6 passes to provide a build-up of 3 mils. The product was especially outstanding in the heat shock test and all samples passed a mandrel of less than 3. The enameled wire had a cut-through temperature of 190° C. The solution composition formed in the present example was stable in storage for over 6 months. A similar composition, except utilizing 175 parts (2.82 mols) of ethylene glycol [in place of the mixture of 140 parts (2.25 mols) of ethylene glycol and 51 parts (0.57 mol) of butanediol 1,4] was stable for less than 3 months' storage as was evidenced by precipitation of solids.

Example 2

| | Parts |
|---|---|
| Dimethyl terephthalate | 776 |
| Ethylene glycol | 105 |
| Glycerine | 120 |
| Butanediol 1,4 | 102 |
| Cresylic acid | 200 |
| Litharge | 0.2 |

When a viscosity of $Z_2$ measured at 40% solids in cresylic acid was reached, as described above, the reaction mixture was diluted with cresylic acid to give a 43.5% solids content and a viscosity of $Z_2$ to $Z_3$. To the thus diluted mixture was added 40 parts of the 9% zinc octoate solution and the composition applied to #18 A.W.G. wire as in Example 1. The coated wire product exhibited the same outstanding heat shock as in Example 1, and the wire had a cut-through temperature of 220° C. The solution composition in the present example was stable in storage for over 6 months. The polyester resin of Example 2 differs from that of Example 1 in that in Example 2 of the total diol on a mol basis 40% was butanediol 1,4 and 60% ethylene glycol, while in Example 1 only 20% of the diol was butanediol 1,4 and 80% was ethylene glycol.

Example 3

| | Parts |
|---|---|
| Dimethyl terephthalate | 776 |
| Ethylene glycol | 140 |
| Glycerine | 120 |
| Pentanediol 1,5 | 58.5 |
| Cresylic acid | 200 |
| Litharge | 0.2 |

After a viscosity of $Z_2$ measured at 40% solids in cresylic acid was reached in the manner described, the mixture was diluted with cresylic acid to give a 41.2% solids content and a viscosity of $Z_2$. The enameled wire had a cut-through temperature of 190° C.

Example 4

| | Parts |
|---|---|
| Dimethyl terephthalate | 776 |
| Ethylene glycol | 150 |
| Glycerine | 150 |
| Butanediol 1,4 | 38 |
| Cresylic acid | 200 |
| Litharge | 0.2 |

After a viscosity of $Z_2$ measured at 40% solids in cresylic acid was reached, the mixture was diluted with cresylic acid to give a 40.0% solids content and a viscosity of $Z_2$. The enameled wire had a cut-through temperature of 220° C.

Example 5

| | Parts |
|---|---|
| Dimethyl terephthalate | 776 |
| Ethylene glycol | 114 |
| Glycerine | 150 |
| Butanediol 1,4 | 88 |
| Cresylic acid | 200 |
| Litharge | 0.2 |

After a viscosity of $Z_2$ measured at 40% solids in cresylic acid was reached, the mixture was diluted with cresylic acid to give a 42.0% solids content and a viscosity of $Z_3$ to $Z_4$. The enameled wire had a cut-through temperature of 240° C.

Example 6

| | Parts |
|---|---|
| Dimethyl terephthalate | 776 |
| Ethylene glycol | 87.5 |
| Glycerine | 150 |
| Butanediol 1,4 | 127 |
| Cresylic acid | 200 |
| Litharge | 0.2 |

After a viscosity of $Z_2$ measured at 40% solids in cresylic acid was reached, the mixture was diluted with cresylic acid to give a 44.0% solids content and a viscosity of $Z_3$ to $Z_4$. The enameled wire had a cut-through temperature of 190° C.

*Example 7*

| | Parts |
|---|---|
| Dimethyl terephthalate | 776 |
| Ethylene glycol | 44 |
| Glycerine | 150 |
| Butanediol 1,4 | 190 |
| Cresylic acid | 200 |
| Litharge | 0.2 |

After a viscosity of $Z_2$ measured at 40% solids in cresylic acid was reached, the mixture was diluted with cresylic acid to give a 41.0% solids content and a viscosity of $Z_3$. The enameled wire had a cut-through temperature of 163° C.

*Example 8*

| | Parts |
|---|---|
| Dimethyl terephthalate | 776 |
| Glycerine | 150 |
| Butanediol 1,4 | 250 |
| Cresylic acid | 200 |
| Litharge | 0.2 |

After a viscosity of $Z_2$ measured at 40% solids in cresylic acid was reached, the mixture was diluted with cresylic acid to give a 35.0% solids content and a viscosity of $Z_5$. The enameled wire had a cut-through temperature of 225° C.

*Example 9*

| | Parts |
|---|---|
| Dimethyl terephthalate | 776 |
| Ethylene glycol | 150 |
| Glycerine | 150 |
| Pentanediol 1,5 | 42.2 |
| Cresylic acid | 200 |
| Litharge | 0.2 |

After a viscosity of $Z_2$ measured at 40% solids in cresylic acid was reached, the mixture was diluted with cresylic acid to give a 42.3% solids content and a viscosity of $Z_3$. The enameled wire had a cut-through temperature of 240° C.

*Example 10*

| | Parts |
|---|---|
| Dimethyl terephthalate | 776 |
| Ethylene glycol | 130 |
| Glycerine | 169 |
| Butanediol 1,4 | 34 |
| Cresylic acid | 200 |
| Litharge | 0.2 |

After a viscosity of $Z_2$ measured at 40% solids in cresylic acid was reached, the mixture was diluted with cresylic acid to give a 40.0% solids content and a viscosity of $Z_2$. The enameled wire had a cut-through temperature of 298° C.

*Example 11*

| | Parts |
|---|---|
| Dimethyl terephthalate | 776 |
| Ethylene glycol | 112 |
| Glycerine | 225 |
| Butanediol 1,4 | 19 |
| Cresylic acid | 200 |
| Litharge | 0.2 |

After a viscosity of $Z_2$ measured at 40% solids in cresylic acid was reached, the mixture was diluted with a mixture of 78% cresylic acid and 22% xylene to give a 37.1% solids content and a viscosity of $Z_3^+$. The enameled wire had a cut-through temperature of 260° C.

*Example 12*

| | Parts |
|---|---|
| Dimethyl terephthalate | 776 |
| Ethylene glycol | 100 |
| Glycerine | 225 |
| Butanediol 1,4 | 36.5 |
| Cresylic acid | 200 |
| Litharge | 0.2 |

After a viscosity of $Z_2$ measured at 40% solids in cresylic acid was reached, the mixture was diluted with a mixture of 60% cresylic acid and 40% xylene to give a 42.5% solids content and a viscosity of $Z_3^+$. The enameled wire had a cut-through temperature of 280° C.

*Example 13*

| | Parts |
|---|---|
| Dimethyl terephthalate | 776 |
| Ethylene glycol | 81 |
| Glycerine | 225 |
| Butanediol 1,4 | 64 |
| Cresylic acid | 200 |
| Litharge | 0.2 |

After a viscosity of $Z_2$ measured at 40% solids in cresylic acid was reached, the mixture was diluted with a mixture of 60% cresylic acid and 40% xylene to give a 42.5% solids content and a viscosity of $Z_3^+$. The enameled wire had a cut-through temperature of 290° C.

*Example 14*

| | Parts |
|---|---|
| Dimethyl terephthalate | 776 |
| Ethylene glycol | 62 |
| Glycerine | 225 |
| Butanediol 1,4 | 91 |
| Cresylic acid | 200 |
| Litharge | 0.2 |

After a viscosity of $Z_2$ measured at 40% solids in cresylic acid was reached, the mixture was diluted with a mixture of 60% cresylic acid and 40% xylene to give a 42.5% solids content and a viscosity of $Z_3^-$. The enameled wire had a cut-through temperature of 275° C.

*Example 15*

| | Parts |
|---|---|
| Dimethyl terephthalate | 776 |
| Ethylene glycol | 31 |
| Glycerine | 225 |
| Butanediol 1,4 | 137 |
| Cresylic acid | 200 |
| Litharge | 0.2 |

After a viscosity of $Z_2$ measured at 40% solids in cresylic acid was reached, the mixture was diluted with a mixture of 60% cresylic acid and 40% xylene to give a 30.0% solids content and a viscosity of $Z_3^+$. The enameled wire had a cut-through temperature of 275° C.

*Example 16*

| | Parts |
|---|---|
| Dimethyl terephthalate | 776 |
| Glycerine | 225 |
| Butanediol 1,4 | 182 |
| Cresylic acid | 200 |
| Litharge | 0.2 |

After a viscosity of $Z_2$ measured at 40% solids in cresylic acid was reached, the mixture was diluted with a mixture of 60% cresylic acid and 40% xylene to give a 39.0% solids content and a viscosity of $Z_3$. The enameled wire had a cut-through temperature of 280° C.

*Example 17*

| | Parts |
|---|---|
| Dimethyl terephthalate | 776 |
| Ethylene glycol | 100 |
| Glycerine | 225 |
| Pentanediol 1,5 | 42 |
| Cresylic acid | 200 |
| Litharge | 0.2 |

After a viscosity of $Z_2$ measured at 40% solids in cresylic acid was reached, the mixture was diluted with a mixture of 82% cresylic acid and 18% xylene to give a 42.0% solids content and a viscosity of $Z_4$. The enameled wire had a cut-through temperature of 275° C.

*Example 18*

| | Parts |
|---|---|
| Dimethyl terephthalate | 776 |
| Ethylene glycol | 87.5 |
| Glycerine | 150 |
| Butene-2-diol-1,4 | 127 |
| Cresylic acid | 200 |
| Litharge | 0.2 |

After a viscosity of $Z_2$ measured at 40% solids in cresylic acid was reached, the mixture was diluted with cresylic acid to give a 50.0% solids content and a viscosity of $Z_2$. The enameled wire had a cut-through temperature of 242° C.

*Example 19*

| | Parts |
|---|---|
| Dimethyl terephthalate | 776 |
| Ethylene glycol | 87.5 |
| Glycerine | 150 |
| Butyne-2-diol-1,4 | 127 |
| Cresylic acid | 200 |
| Litharge | 0.2 |

After a viscosity of $Z_2$ measured at 40% solids in cresylic acid was reached, the mixture was diluted with cresylic acid to give a 44.0% solids content and a viscosity of $Z_4$ to $Z_5$. This solution was applied to the #18 A.W.G. wire by the die application procedure previously set forth, but using a speed of 30 feet/min. The enameled wire had a cut-through temperature of 265° C.

It has additionally been found that the novel polymeric esters can be still further improved in giving smoother, more coherent coatings, especially on fine size wires, e.g., in the size range of #25 A.W.G. to #45 A.W.G., by adding certain phenol-formaldehyde resins to the composition. The use of the phenol-formaldehyde resin also has the further advantage that the same thickness of enamel coating can be obtained on the wire with few passes through the enamel solution in the free dip method.

The phenol-formaldehyde resins which can be used in the improved form of the invention are made by reacting 0.7 to 0.95 mol of formaldehyde (in the form of aqueous formaldehyde, trioxane, paraformaldehyde, etc.) with 1 mol of a phenol, such as phenol per se, m-cresol, p-cresol, 3,5 xylenol or 2,5 xylenol, commercial mixtures of such phenols as cresylic acid, meta-para cresol, mixed xylenols, etc., can be used. Preferably, the phenol employed is alkylated, having 7 to 8 carbon atoms, and the resin should also be cresylic acid soluble. The phenolic resin is formed by condensation under alkaline conditions. Suitable catalysts are triethanolamine, sodium hydroxide, potassium hydroxide and ammonia. The catalyst is employed in an amount of 1 to 4% of the meta-para cresol or other phenol. The phenol-formaldehyde resin is generally used in an amount of 2 to 20% of the polymeric terephthalate ester and preferably in an amount of 6 to 7% of the ester. Example 20 below illustrates a preferred method of forming the phenol-formaldehyde resin while the succeeding examples illustrate the use of such phenolic resins in accordance with the invention.

*Example 20*

| | Grams |
|---|---|
| Meta-para cresol | 108 |
| Formalin (37%) | 64.8 |
| Triethanolamine | 3.24 |

The mixture was placed into a flask equipped with a stirrer, thermometer, and reflux condenser. The charge was heated until refluxing occurred and the refluxing was continued for a period of 90 minutes. The charge was then cooled to 60° C. and the reflux condenser replaced by a distillation condenser fitted with a flask at the discharge end, so that the entire system could be evacuated. A vacuum of 508 to 660 millimeters of mercury was applied and the charge distilled with the aid of heat until the temperature of the resin in the flask was 80° C. When the resin reached this temperature, heating and vacuum were discontinued, and a weight of cresylic acid equal to the weight of the resin in the flask was added. This resulted in a 50% solution of the resin in cresylic acid, and was a convenient manner in which to handle the resin.

When a phenol-formaldehyde resin is employed with the polyester, the metal drier such as the zinc octoate is usually omitted and in the following examples no zinc octoate was employed.

*Example 21*

To the 42.0% solids terephthalate composition prepared in Example 5 there was added the meta-para cresol-formaldehyde resin solution of Example 9 in an amount sufficient to give 6.5% of the resin by weight of the polymeric terephthalate ester in the enamel. Then the mixture was applied to #25 A.W.G. copper wire by the die application method using 6 passes and a speed of 25 feet/min. The coated wire was baked in an oven at 399° C. in the manner previously set forth.

*Example 22*

Example 21 was repeated but using only enough of the cresol-formaldehyde resin solution to give 2% of the cresol-formaldehyde resin based on the polymeric terephthalic ester.

*Example 23*

Example 21 was repeated but using the 35.0% solids terephthalate composition prepared in Example 5. Also, in place of 6.5% of the cresol-formaldehyde resin there was used sufficient cresol-formaldehyde resin solution to provide 20% of the resin based on the polymeric terephthalate ester.

We claim:

1. An electrical conductor provided with a continuous coating of the polymeric ester of an acid selected from the group consisting of terephthalic acid and isophthalic acid with a mixture of polyhydric alcohols consisting of (a) 30 to 70% by weight of a saturated aliphatic polyhydric alcohol having at least three hydroxyl groups and (b) 70 to 30% by weight of an $\alpha,\omega$ aliphatic hydrocarbon diol wherein from 20 to 100% by weight of said $\alpha,\omega$ diol has four to five carbon atoms and the balance of the $\alpha,\omega$ diol is ethylene glycol.

2. A conductor as in claim 1 wherein the total number of hydroxyl groups on the alcohols is from 1 to 1.6 times the total number of carboxyl groups of the acid.

3. An electric conductor as in claim 2 wherein the ester is an ester of terephthalic acid.

4. An electrical conductor as in claim 3 wherein the polyhydric alcohol containing at least three hydroxyl groups is glycerine.

5. An electrical conductor as in claim 3 wherein the polyhydric alcohol containing at least three hydroxyl groups is pentaerythritol.

6. An electrical conductor as in claim 3 wherein the diol is all butanediol 1,4.

7. An electrical conductor as in claim 6 wherein the polyhydric alcohol is glycerine.

8. An electrical conductor as in claim 3 wherein the diol comprises pentanediol 1,5.

9. An electrical conductor as in claim 3 wherein the diol includes both ethylene glycol and butanediol 1,4.

10. An electrical conductor as in claim 9 wherein the polyhydric alcohol having at least three hydroxyl groups is glycerine.

11. A composition of matter comprising the polymeric ester of an acid selected from the group consisting of terephthalic acid and isophthalic acid with a mixture of polyhydric alcohols consisting of (a) 30 to 70% by weight of a saturated aliphatic polyhydric alcohol having at least three hydroxyl groups and (b) 70 to 30% by weight of an $\alpha,\omega$ aliphatic hydrocarbon diol wherein from 20 to 100% by weight of said $\alpha,\omega$ diol has four to five carbon atoms and the balance of the $\alpha,\omega$ diol is ethylene glycol.

12. A composition according to claim 11 wherein the ester is an ester of terephthalic acid and the total number of hydroxyl groups on the alcohols is from 1 to 1.6 times the total number of carboxyl groups on the acid.

13. A composition according to claim 12 wherein the polyhydric alcohol containing at least three hydroxyl groups is glycerine.

14. A composition according to claim 13 wherein the diol comprises butanediol 1,4.

15. A composition according to claim 14 wherein the diol consists of butanediol 1,4.

16. A composition according to claim 11 wherein the ester is an ester of terephthalic acid and the total number of hydroxyl groups on the alcohols is from 1 to 1.6 times the total number of carboxyl groups on the acid, the polyhydric alcohol containing at least three hydroxyl groups is glycerine and the diol is a mixture of butanediol 1,4 and the ethylene glycol.

17. A composition according to claim 11 wherein the ester is an ester of terephthalic acid and the total number of hydroxyl groups on the alcohols is from 1 to 1.6 times the total number of carboxyl groups on the acid and the diol comprises pentanediol 1,5.

18. A composition according to claim 11 wherein the ester is an ester of terephthalic acid and the total number of hydroxyl groups on the alcohols is from 1 to 1.6 times the total number of carboxyl groups on the acid and the polyhydric alcohol containing at least three hydroxyl groups is pentaerythritol.

19. A composition according to claim 11 including a cresol as a solvent.

20. A composition according to claim 11 including an alkaline condensed reaction product of an alkylated phenol having 7 to 8 carbon atoms with 0.7 to 0.95 mols of formaldehyde per mol of the phenol.

21. A process of preparing a polyester resin comprising reacting materials consisting of (1) 25 to 56 equivalent percent of a lower dialkyl ester of a member of the group consisting of terephthalic acid and isophthalic acid, (2) 15 to 46 equivalent percent of an $\alpha,\omega$ aliphatic hydrocarbon diol selected from the group consisting of an $\alpha,\omega$ diol having 4 to 5 carbon atoms and mixtures of such a diol with up to 80% by weight of ethylene glycol, and (3) 13 to 44 equivalent percent of an aliphatic polyhydric alcohol having at least three hydroxyl groups, the sum of equivalents of (1), (2) and (3) equaling 100 equivalent percent.

22. A process according to claim 21 wherein the dialkyl ester is dimethyl terephthalate and the alcohol having at least three hydroxyl groups is glycerine.

23. A process according to claim 21 wherein the aliphatic hydrocarbon diol consists of butanediol 1,4.

24. A process according to claim 21 wherein the $\alpha,\omega$ diol comprises butyne-2-diol 1,4.

25. A process according to claim 21 wherein the $\alpha,\omega$ comprises butyne-2-diol 1,4.

26. A composition of matter comprising the polymeric ester of terephthalic acid with a mixture of polyhydric alcohols consisting of (a) 30 to 70% glycerine and (b) 70 to 30% by weight of an $\alpha,\omega$ aliphatic hydrocarbon diol wherein about 35 mol percent of said $\alpha,\omega$ diol has 4 to 5 carbon atoms and the balance of the $\alpha,\omega$ diol is ethylene glycol.

27. A composition according to claim 26 wherein the $\alpha,\omega$ diol having 4 to 5 carbon atoms is butanediol 1,4.

References Cited in the file of this patent

UNITED STATES PATENTS

| | | |
|---|---|---|
| 2,497,376 | Swallow | Feb. 14, 1950 |
| 2,589,652 | Allison | Mar. 18, 1952 |
| 2,686,739 | Kohl | Aug. 17, 1954 |
| 2,686,740 | Goodwin | Aug. 17, 1954 |
| 2,839,492 | Caldwell | June 17, 1958 |

FOREIGN PATENTS

| | | |
|---|---|---|
| 629,490 | Great Britain | Sept. 21, 1949 |